(12) United States Patent
Kimura et al.

(10) Patent No.: US 10,148,158 B2
(45) Date of Patent: Dec. 4, 2018

(54) VARNISH IMPREGNATION APPARATUS AND VARNISH IMPREGNATION METHOD

(71) Applicant: AISIN AW CO., LTD., Anjo-shi, Aichi-ken (JP)

(72) Inventors: Hideaki Kimura, Okazaki (JP); Tsuyoshi Niwa, Anjo (JP); Takamitsu Sugimoto, Nishio (JP); Susumu Kato, Anjo (JP); Shigeru Maeda, Toyota (JP); Takeshi Yokoyama, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 65 days.

(21) Appl. No.: 14/895,790

(22) PCT Filed: Jun. 11, 2014

(86) PCT No.: PCT/JP2014/065507
§ 371 (c)(1),
(2) Date: Dec. 3, 2015

(87) PCT Pub. No.: WO2015/005052
PCT Pub. Date: Jan. 15, 2015

(65) Prior Publication Data
US 2016/0126816 A1 May 5, 2016

(30) Foreign Application Priority Data
Jul. 12, 2013 (JP) ................................. 2013-146981

(51) Int. Cl.
*H02K 15/12* (2006.01)
*B05C 13/02* (2006.01)
*B05C 9/14* (2006.01)

(52) U.S. Cl.
CPC ............. *H02K 15/125* (2013.01); *B05C 9/14* (2013.01); *B05C 13/02* (2013.01); *H02K 15/12* (2013.01)

(58) Field of Classification Search
None
See application file for complete search history.

(56) References Cited

U.S. PATENT DOCUMENTS 3,527,662 A * 9/1970 Elsworth ................ H02K 15/12
118/315
5,685,910 A * 11/1997 Thigpen .................. H02K 15/12
118/306

(Continued)

FOREIGN PATENT DOCUMENTS

CA        803967 A    1/1969
EP     2104207 A1    9/2009

(Continued)

OTHER PUBLICATIONS

Jul. 6, 2016 Search Report issued in European Patent Application No. 14822461.1.

*Primary Examiner* — Binu Thomas
(74) *Attorney, Agent, or Firm* — Oliff PLC

(57) ABSTRACT

A varnish impregnation apparatus that includes a support that supports a stator, in which the stator coil is mounted to the stator core, with an axial direction of the stator directed in a horizontal direction while grasping a radially outer side of the stator, and that is rotationally driven by a rotary device to rotate the stator; a varnish dropping device that drops the varnish toward a coil end portion of the stator which is rotated while being supported by the support; and a heater disposed in a cavity portion provided at an axial center of the stator core of the stator supported by the support to heat the stator from a radially inner side of the stator.

12 Claims, 11 Drawing Sheets

(56) References Cited

U.S. PATENT DOCUMENTS

| | | | | |
|---|---|---|---|---|
| 6,302,961 | B1* | 10/2001 | Robie | B05C 13/025 |
| | | | | 118/315 |
| 2006/0165879 | A1* | 7/2006 | Kimura | H02K 15/12 |
| | | | | 118/52 |
| 2010/0320194 | A1* | 12/2010 | Koide | H02K 15/12 |
| | | | | 219/635 |

FOREIGN PATENT DOCUMENTS

| JP | S61-042246 A | 2/1986 |
|---|---|---|
| JP | H07-274452 A | 10/1995 |
| JP | 2002-218718 A | 8/2002 |
| JP | 2005-086951 A | 3/2005 |
| JP | 2005-086954 A | 3/2005 |
| JP | 2007-097238 A | 4/2007 |
| JP | 2007-166712 A | 6/2007 |
| JP | 2008-072825 A | 3/2008 |
| JP | 2008-092733 A | 4/2008 |
| JP | 2008-193875 A | 8/2008 |
| JP | 2011-097790 A | 5/2011 |
| JP | 2012-005283 A | 1/2012 |
| JP | 2013-066323 A | 4/2013 |

* cited by examiner

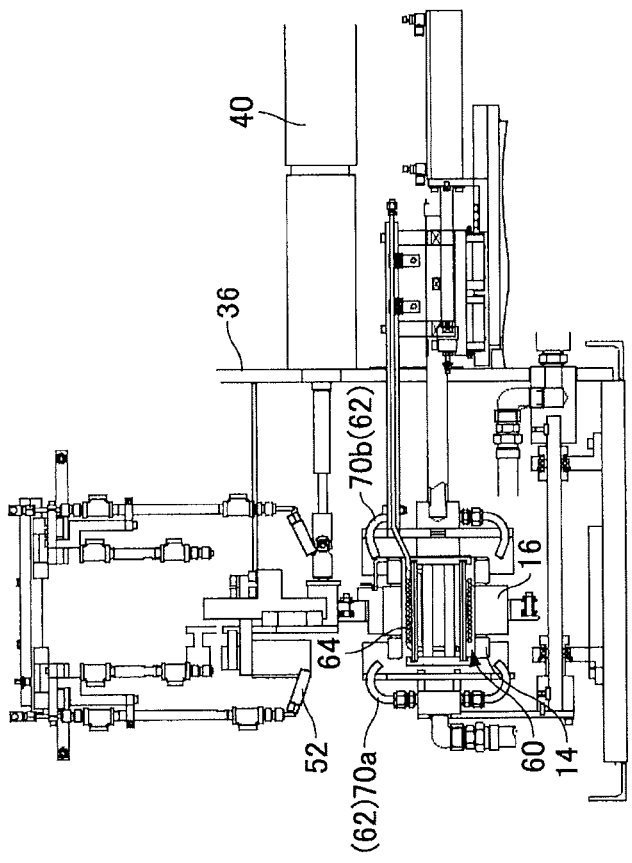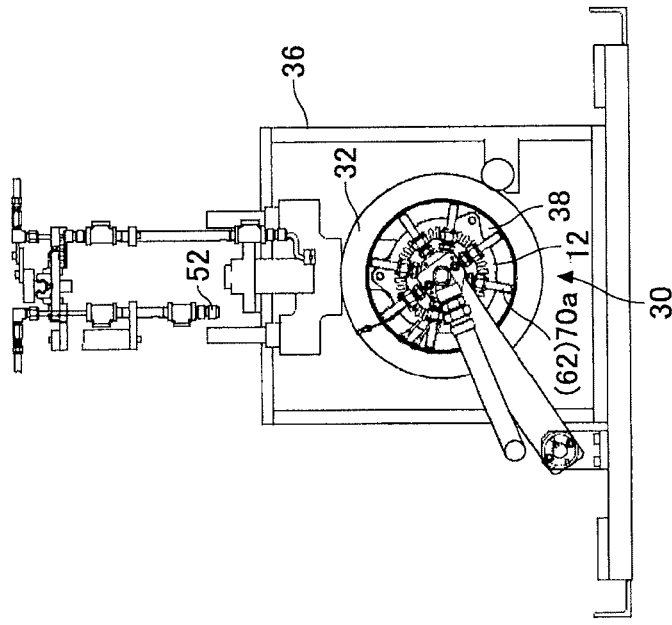

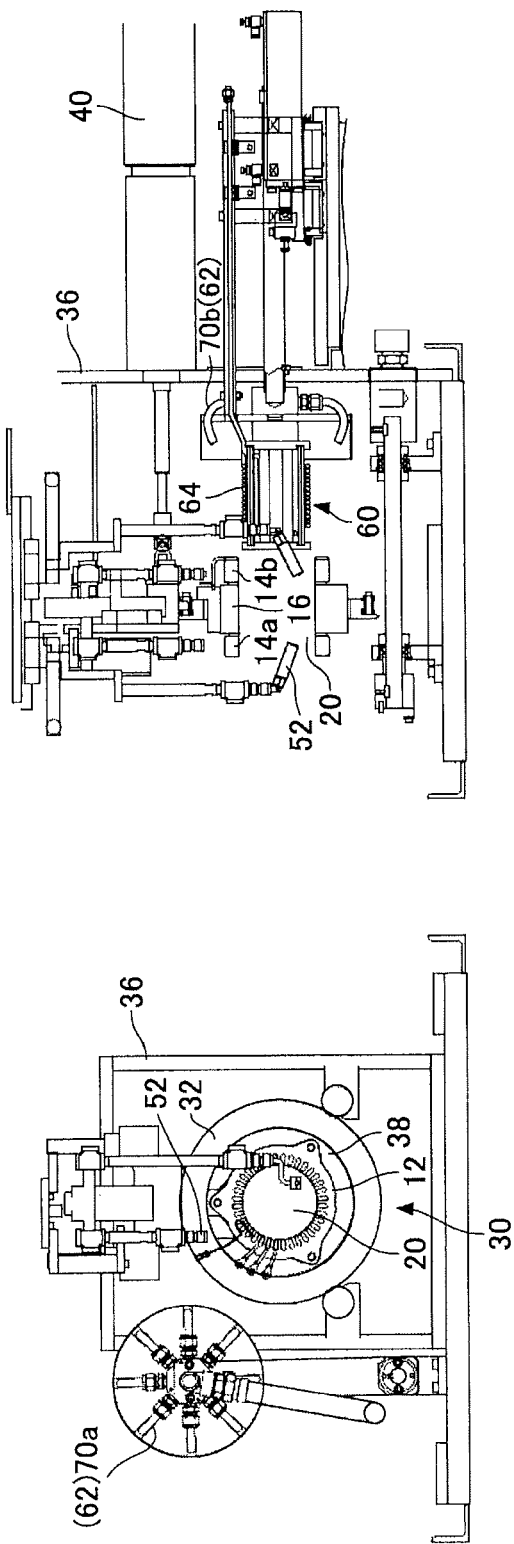

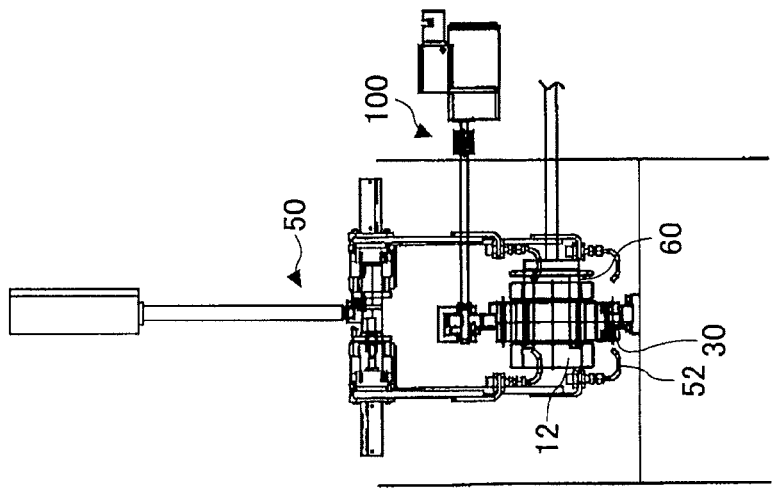
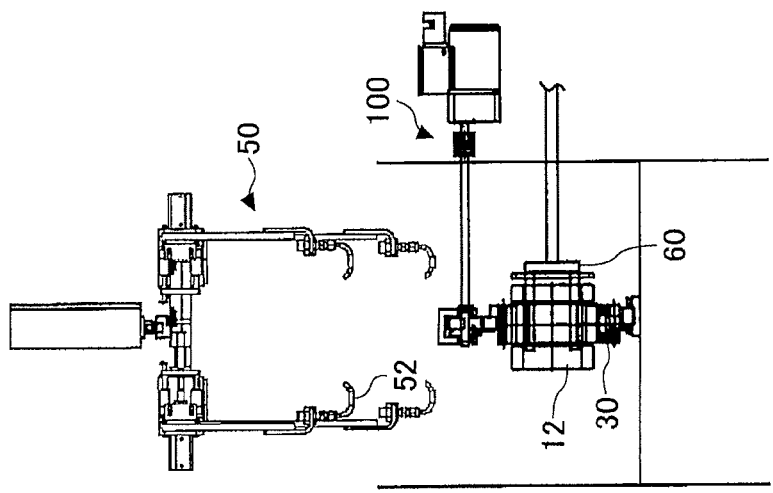
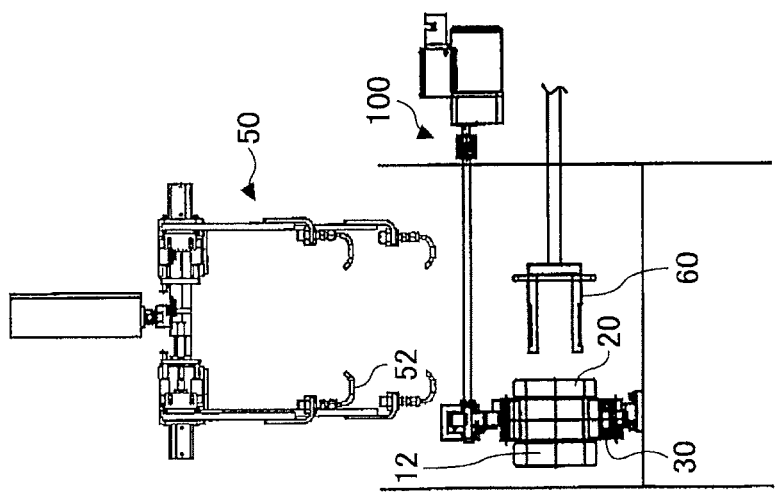

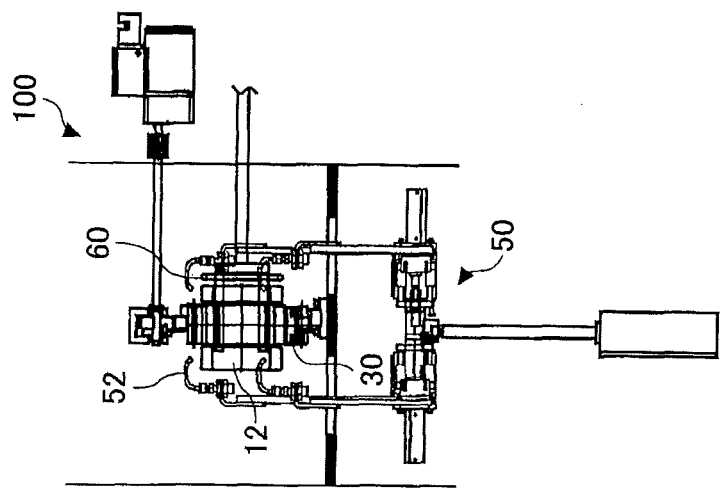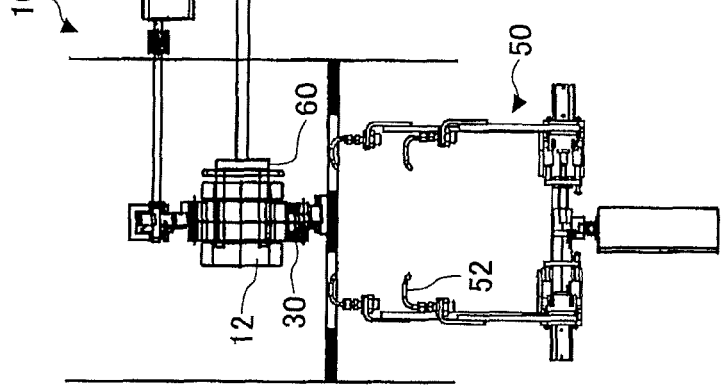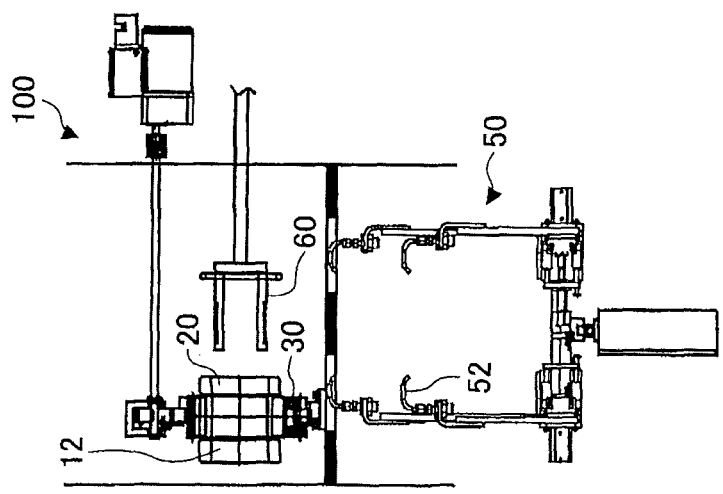

VARNISH IMPREGNATION APPARATUS AND VARNISH IMPREGNATION METHOD

BACKGROUND

The present disclosure relates to a varnish impregnation apparatus and a varnish impregnation method, and in particular to a varnish impregnation apparatus and a varnish impregnation method that are suitable to impregnate a stator coil mounted to a stator core with varnish.

There have hitherto been known a varnish impregnation apparatus and a varnish impregnation method for impregnating a stator coil mounted to a stator core with varnish (see Japanese Patent Application Publication No. 2007-166712 and Japanese Patent Application Publication No. 2007-097238 for example). The varnish impregnation apparatus described in Japanese Patent Application Publication No. 2007-166712 includes a support that rotatably supports a stator in which a stator coil is mounted to a stator core. The support includes a workpiece rotary shaft inserted into a cavity portion provided at the axial center of the stator core. The workpiece rotary shaft is used to support the stator on the radially inner side of the stator, and to rotate the stator through rotation of the workpiece rotary shaft.

The varnish impregnation apparatus described above includes a dropping nozzle that drops varnish toward a coil end portion of the stator rotated while being supported by the support, and a heating device that heats the stator supported by the support. The heating device feeds hot air toward the stator supported by the support. The heating device preliminarily heats the stator in order to reduce the viscosity of the varnish to be dropped before the varnish is dropped onto the coil end portion of the stator, and heats the dropped varnish to cure the vanish after the varnish is dropped onto the coil end portion of the stator.

In the varnish impregnation apparatus described in Japanese Patent Application Publication No. 2007-097238, meanwhile, an induction heating coil is inserted into a cavity portion provided at the axial center of a stator core, a stator is heated through induction heating, and varnish impregnation is performed after the stator is transferred to another station for varnish impregnation.

SUMMARY

In the varnish impregnation apparatus described in Japanese Patent Application Publication No. 2007-166712, as described above, the support supports the stator on the radially inner side, the dropping nozzle drops the varnish toward the coil end portion of the stator, and the heating device heats the supported stator using hot air from the radially outer side or the axially outer side. In the varnish impregnation apparatus, however, varnish impregnation is performed with the stator core supported by the support from the radially inner side, and therefore the varnish overflowing and dripping from the stator may adhere to the support. In addition, the workpiece rotary shaft which rotates the stator is inserted into the cavity portion of the stator core, and therefore the heating device which heats the stator from the radially inner side cannot be disposed in the cavity portion of the stator core. As a result, the coil mounted to the stator core (in particular, the coil disposed in a slot) is not heated efficiently and effectively, which extends the heating time.

In the varnish impregnation apparatus described in Japanese Patent Application Publication No. 2007-097238, meanwhile, the stator core is placed on a reception stand with the axis of the stator core directed in the vertical direction, the induction coil is inserted into the cavity portion provided at the axial center of the stator core to heat the stator through induction heating from the radially inner side of the stator. After that, the stator is transferred to another station for varnish impregnation, and the stator core is placed on a reception stand with the axis of the stator core directed in the vertical direction. After that, varnish impregnation is performed. Because varnish impregnation is performed with the stator core placed on the reception stand with the axis of the stator core directed in the vertical direction, however, the varnish overflowing and dripping from the coil may adhere to the outer peripheral surface of the stator.

In order to prevent adhesion of the varnish to the outer peripheral surface of the stator, meanwhile, it is considered to perform varnish impregnation with the stator supported on the radially inner side as in the technology described in Japanese Patent Application Publication No. 2007-166712. However, this requires a mechanism exclusively for dropping varnish to support the stator coil from the radially inner side after induction heating and change the posture such that the axis of the stator coil is directed in the horizontal direction, and the varnish overflowing and dripping from the stator may adhere to the support as in the technology described in Japanese Patent Application Publication No. 2007-166712.

The present disclosure has been made in view of the foregoing issues, and therefore, according to an exemplary aspect, there is provided a varnish impregnation apparatus and a varnish impregnation method capable of preventing adhesion of varnish to a support for a stator in which a stator coil is mounted to a stator core while efficiently and effectively heating the stator to impregnate the stator coil with the varnish.

The present disclosure according to an exemplary aspect includes a varnish impregnation apparatus that impregnates a stator coil mounted to a stator core, in which a slot opens toward a radially inner side, with varnish, including: a support that supports a stator, in which the stator coil is mounted to the stator core, with an axial direction of the stator directed in a horizontal direction while grasping a radially outer side of the stator, and that is rotationally driven by a rotary device to rotate the stator; a varnish dropping device that drops the varnish toward a coil end portion of the stator which is rotated while being supported by the support; and a heater disposed in a cavity portion provided at an axial center of the stator core of the stator supported by the support to heat the stator from a radially inner side of the stator.

The present disclosure according to another exemplary aspect includes a varnish impregnation method for impregnating a stator coil mounted to a stator core, in which a slot opens toward a radially inner side, with varnish, including: heating a stator, in which the stator coil is mounted to the stator core and which is supported with an axial direction of the stator directed in a horizontal direction with a support grasping a radially outer side of the stator, from a radially inner side of the stator using a heater disposed in a cavity portion provided at an axial center of the stator core; dropping the varnish toward a coil end portion of the stator using a varnish dropping device, the stator being supported with the axial direction directed in the horizontal direction with the support grasping the radially outer side and being rotated with the support rotationally driven by a rotary device with the heater retracted from the cavity portion, the varnish dropping being performed after the heating of the stator; and heating the varnish dropped onto the coil end portion using the heater to cure the varnish with the stator supported with the axial direction directed in the horizontal direction with the support grasping the radially outer side of the stator and with the heater disposed in the cavity portion, the heating the varnish being performed after the varnish dropping.

According to the present disclosure, it is possible to prevent adhesion of varnish to a support for a stator in which a stator coil is mounted to a stator core while efficiently and effectively heating the stator to impregnate the stator coil with the varnish.

BRIEF DESCRIPTION OF THE DRAWINGS

FIG. 5 illustrates operation of the varnish impregnation apparatus according to the embodiment at the time of preliminary heating the stator.

FIG. 6 illustrates operation of the varnish impregnation apparatus according to the embodiment at the time of dropping the varnish onto coil end portions of the stator.

FIG. 10 illustrates operation of a varnish impregnation apparatus according to a modification of the present disclosure.

FIG. 11 illustrates operation of a varnish impregnation apparatus according to a modification of the present disclosure.

DETAILED DESCRIPTION OF EMBODIMENTS

A varnish impregnation apparatus and a varnish impregnation method according to a specific embodiment of the present disclosure will be described below with reference to the drawings.

Figure 1:
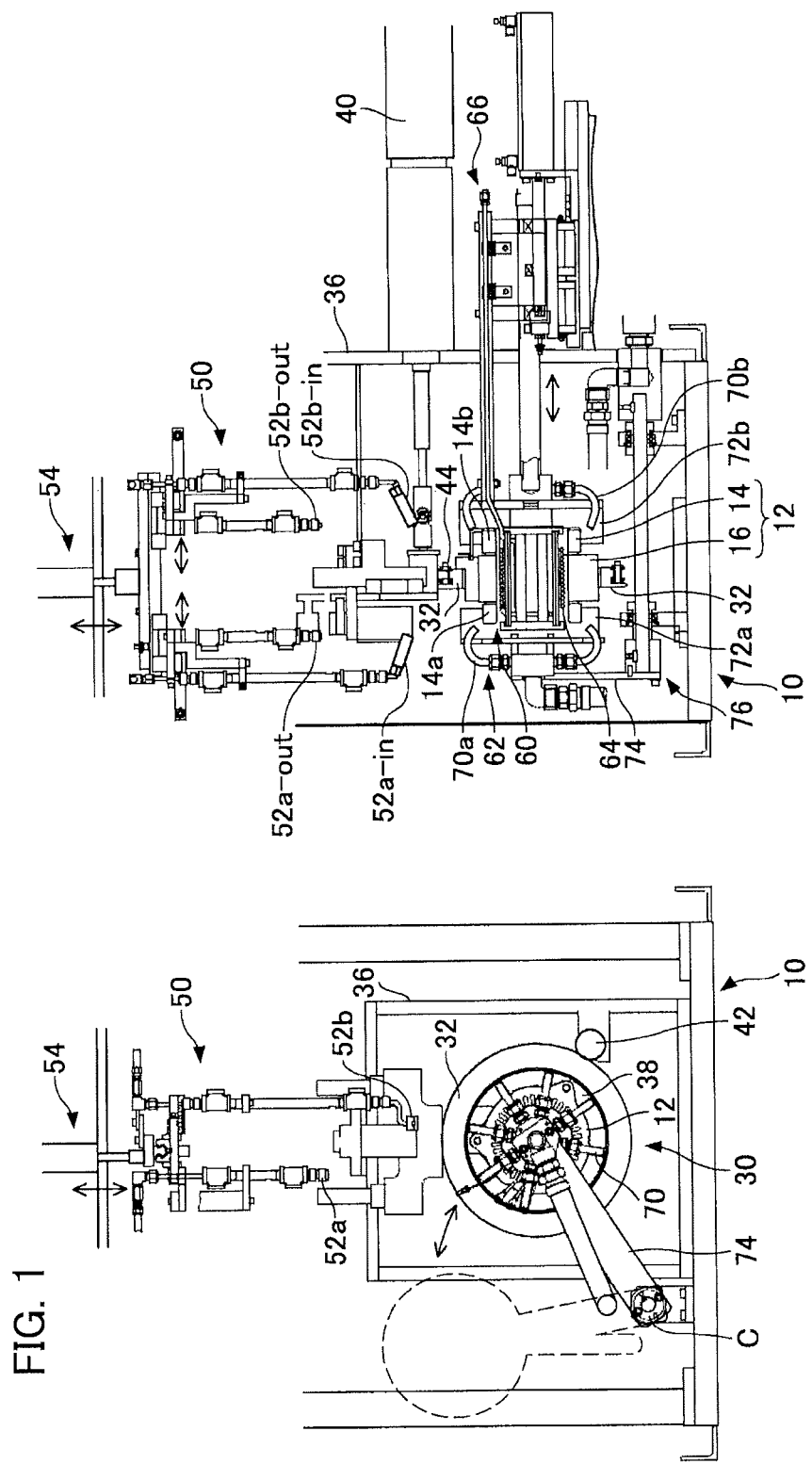
FIG. 1 illustrates the configuration of a varnish impregnation apparatus according to an embodiment of the present disclosure.
Figure 2:
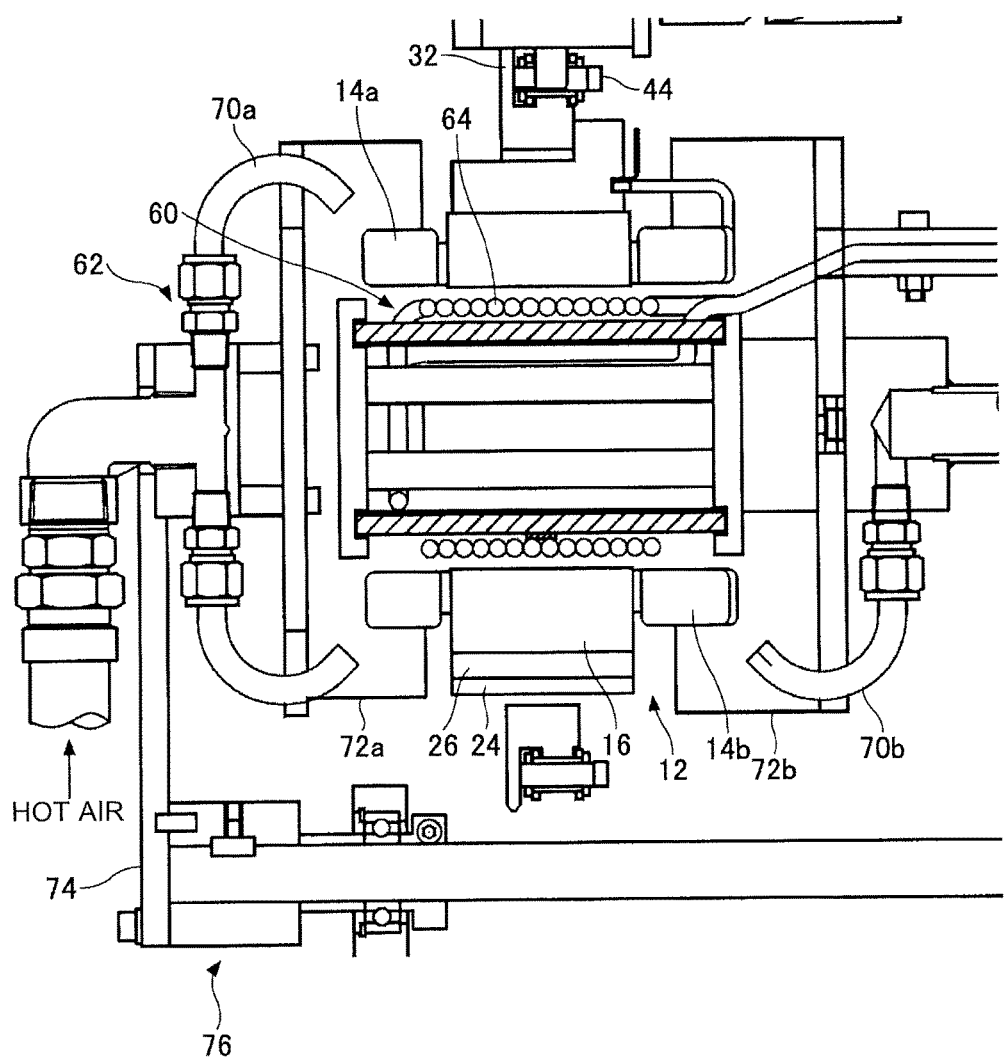
FIG. 2 is a sectional view illustrating an essential portion of the varnish impregnation apparatus according to the embodiment.
Figure 3:
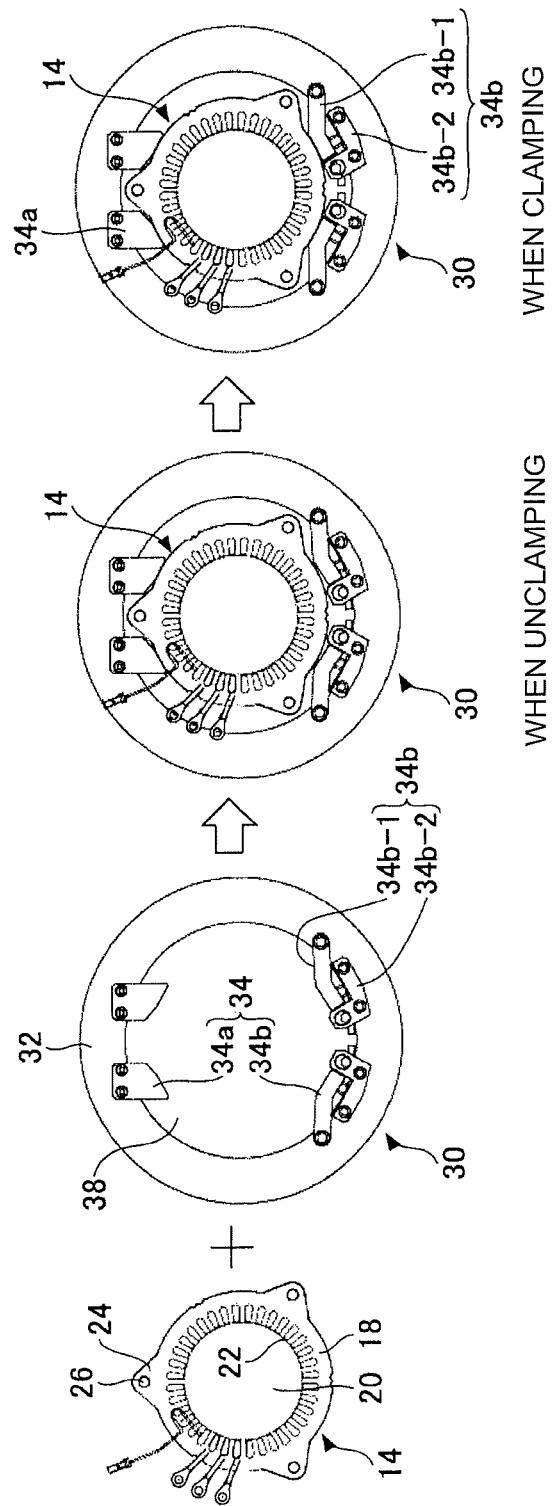
FIG. 3 illustrates the structure of a stator onto which the varnish impregnation apparatus according to the embodiment drops varnish and a support that supports the stator and a method of attaching the stator to the support.

FIG. 1 illustrates the configuration of a varnish impregnation apparatus 10 according to an embodiment of the present disclosure. FIG. 1A is a front view of the varnish impregnation apparatus 10. FIG. 1B is a side view (for some components, a sectional view) of the varnish impregnation apparatus 10. FIG. 2 is a sectional view illustrating an essential portion of the varnish impregnation apparatus 10 according to the embodiment. FIG. 3 illustrates the structure of a stator that includes a stator coil onto which the varnish impregnation apparatus 10 according to the embodiment drops varnish and a support that supports the stator and a method of attaching the stator to the support.

The varnish impregnation apparatus 10 according to the embodiment is an apparatus that impregnates a stator coil 14 of a stator 12 for use in a rotary electric machine, such as a three-phase AC motor, with varnish, for example. The varnish is used to secure the electrical insulation, earthquake resistance, oil resistance, chemical resistance, and heat radiation performance of the stator coil 14. The stator 12 is a stationary element disposed opposite to a rotor that serves as a rotary element via a predetermined air gap on the radially outer side of the rotor, and generates a magnetic field to rotate the rotor when the stator coil 14 is energized. The stator 12 includes the stator coil 14 and a stator core 16.

The stator core 16 is a member formed in a hollow cylindrical shape, and includes a yoke 18 formed in an annular shape, a cavity portion 20 formed in a columnar shape at the axial center, and teeth 22 that project toward the radially inner side (that is, toward the axial center) from the inner peripheral surface of the yoke 18. A plurality of teeth 22 are provided at equal intervals in the circumferential direction on the inner peripheral surface of the yoke 18. The stator core 16 is formed by stacking a plurality of magnetic steel sheets coated for insulation in the axial direction.

The stator core 16 includes fixation lug portions 24 that project in an angle shape toward the radially outer side from the outer peripheral surface of the yoke 18. The stator core 16 includes a plurality of (e.g. three) fixation lug portions 24 provided in the circumferential direction. The fixation lug portions 24 are provided with through holes 26 that penetrate in the axial direction. After being manufactured, the stator 12 is attached for fixation to a fixation target by inserting bolts into the through holes 26 of the fixation lug portions 24 of the stator core 16 and fastening the bolts to the fixation target.

The stator coil 14 is mounted to the stator core 16 described above. Specifically, the stator coil 14 is wound around the teeth 22 while being housed in a slot formed between two teeth 22 that are adjacent in the circumferential direction. The slot described above opens toward the radially inner side in the stator core 16. In the case where the rotary electric machine is applied to a three-phase AC motor, for example, the stator coil 14 constitutes any of a U-phase coil, a V-phase coil, and a W-phase coil. In this case, the U-phase coil, the V-phase coil, and the W-phase coil constituted by the stator coil 14 are wound around the teeth 22 in this order in the circumferential direction. The stator coil 14 includes coil end portions 14a and 14b that project toward both sides, in the axial direction, from the slot of the stator core 16.

The varnish impregnation apparatus 10 includes a support 30 that supports the stator 12 in which the stator coil 14 is mounted to the stator core 16. The support 30 is a radially outer grasping ring that contacts the outer surface of the stator core 16 (specifically, the yoke 18) of the stator 12 to grasp the stator 12 on the radially outer side of the stator 12. Hereinafter, the support 30 will be referred to as a "radially outer grasping ring 30".

The radially outer grasping ring 30 is disposed between both end surfaces, in the axial direction, on the outer peripheral side of the stator core 16 of the stator 12 to be supported, and supports the stator 12 using a member that projects toward the radially inner side (toward the axial center). The radially outer grasping ring 30 supports the stator 12 with the axial direction directed in the horizontal direction. The radially outer grasping ring 30 includes a ring portion 32 formed in an annular shape and a clamp portion 34 that supports the stator core 16.

The ring portion 32 is supported so as to be rotatable with respect to a frame 36 fixed to the ground surface. A cavity portion 38 in a columnar shape is formed at the axial center of the ring portion 32. The cavity portion 38 is formed with a size required to house the entire circumference of the stator core 16. Specifically, the diameter of the cavity portion 38, that is, the inside diameter of the ring portion 32, is set to be larger than the outside diameter of the stator core 16 including the fixation lug portions 24. The stators 12 having a wide range of outside diameters can be supported by varying the size of the ring portion 32.

The clamp portion 34 includes a projecting portion 34a that projects toward the radially inner side (toward the axial center) from the inner peripheral surface of the ring portion 32, and a chuck portion 34b, the position of which in the radial direction in the cavity portion 38 of the ring portion 32 is variable. The stators 12 having various outside diameters can be supported by varying the size of the portions 34a and 34b composing the clamp portion 34.

The projecting portion 34a has a role of clamping the fixation lug portion 24 of the stator core 16 from both sides in the circumferential direction to grasp the stator core 16, and hence the stator 12, on the radially outer side of the stator 12 to make the stator 12 unrotatable with respect to the ring portion 32. The projecting portion 34a is fixed to the ring portion 32. The projecting portion 34a is composed of a pair of projections so as to clamp the fixation lug portion 24 of the stator core 16 in the circumferential direction, and the two projections are formed at positions spaced in the circumferential direction of the ring portion 32 in an appropriate shape so as to match the shape of the fixation lug portion 24.

The chuck portion 34b has a role of facilitating attachment and detachment of the stator 12 to and from the radially outer grasping ring 30, and a role of supporting the stator 12 on the radially outer grasping ring 30. The chuck portion 34b includes a turning portion 34b-1 supported so as to be turnable with respect to the ring portion 32, and a fixed portion 34b-2 fixed to the ring portion 32. The turning portion 34b-1 is a member that extends in a curved bar shape. One end of the turning portion 34b-1 is supported on the ring portion 32 for fixation.

The turning portion 34b-1 is turnable about the one end fixed to the ring portion 32 between a clamping position (the position indicated as "WHEN CLAMPING" in FIG. 3), at which the other end of the turning portion 34b-1 is positioned relatively on the radially inner side in the cavity portion 38, and an unclamping position (the position indicated as "WHEN UNCLAMPING" in FIG. 3), at which the other end of the turning portion 34b-1 is positioned relatively on the radially outer side in the cavity portion 38. The fixed portion 34b-2 has a role of restricting the turning of the turning portion 34b-1 between the clamping position described above and the unclamping position described above.

The chuck portion 34b is provided at two locations in the circumferential direction of the ring portion 32. In each chuck portion 34b, at the clamping position described above, the distal end of the turning portion 34b-1 contacts the outer peripheral surface of the stator core 16 of the stator 12 housed in the cavity portion 38 of the ring portion 32 to support the stator 12. At the unclamping position described above, on the other hand, the contact between the distal end of the turning portion 34b-1 and the outer peripheral surface of the stator core 16 of the stator 12 housed in the cavity portion 38 of the ring portion 32 is released to release the support of the stator 12. The two chuck portions 34b provided as spaced in the circumferential direction of the ring portion 32 operate in synchronization with each other. The turning portions 34b-1 of the two chuck portions 34b provided as spaced in the circumferential direction of the ring portion 32 may be turned between the clamping position and the unclamping position by a spring force or the like.

The varnish impregnation apparatus 10 also includes a rotary motor 40 that rotationally drives the radially outer grasping ring 30, and a rotary support member 42 that supports the radially outer grasping ring 30. Both a housing of the rotary motor 40 and the rotary support member 42 are fixed to the frame 36. As described above, in the case where the stators 12 having a wide range of outside diameters are to be supported, the stators having outside diameters in a certain range can be supported without changing the position of the rotary support member 42 by varying the size of the ring portion 32. However, by changing the position of the rotary support member 42, the radially outer grasping ring 30 can reliably rotationally support the ring portion 32 while supporting the stators having a wide range of outside diameters.

The rotary motor 40 is rotated in accordance with an electrical instruction from a controller mainly constituted of a microcomputer. The rotary support member 42 is provided at two locations below and on the outer peripheral side of the radially outer grasping ring 30. The rotary support member 42 is a member that supports the radially outer grasping ring 30 so as to be rotatable about the axial center. A rotary shaft of the rotary motor 40 is connected to the ring portion 32 of the radially outer grasping ring 30 via a bearing 44.

Rotation of the rotary motor 40 is transferred to the ring portion 32 of the radially outer grasping ring 30 via the hearing 44. The radially outer grasping ring 30 is rotated through rotation of the rotary motor 40 while being supported by the rotary support member 42. When the radially outer grasping ring 30 is rotated, the stator 12 supported by the radially outer grasping ring 30 is rotated about the axis of the stator 12 along with the rotation. The radially outer grasping ring 30 is rotationally driven by the rotary motor 40 to rotate the stator 12 supported by the radially outer grasping ring 30. Thus, in the varnish impregnation apparatus 10, the stator 12 in which the stator coil 14 is mounted to the stator core 16 is rotated through rotation of the rotary motor 40 while being grasped on the radially outer side by the radially outer grasping ring 30 to be supported.

The varnish impregnation apparatus 10 also includes a varnish dropping device 50. The varnish dropping device 50 is a device that drops the varnish toward the coil end portions 14a and 14b of the stator 12 rotated by the rotary motor 40 while being supported by the radially outer grasping ring 30. The varnish dropping device 50 includes dropping nozzles 52 that communicate with a tank that stores the varnish. The varnish dropping device 50 suctions the varnish in the tank using a pump or the like and supplies the varnish to the dropping nozzles 52 in accordance with an electrical instruction from the controller to drop the varnish from the dropping nozzles 52.

Two dropping nozzles 52 are provided for each of the coil end portions 14a and 14b at both ends, in the axial direction, of the stator 12. Specifically, the varnish dropping device 50 includes, as the dropping nozzles 52, a first radially outer dropping nozzle 52a-out and a first radially inner dropping nozzle 52a-in corresponding to the coil end portion 14a, and a second radially outer dropping nozzle 52b-out and a second radially inner dropping nozzle 52b-in corresponding to the coil end portion 14b.

The first radially outer dropping nozzle 52a-out is used to drop the varnish toward the radially outer side of the coil end portion 14a. The first radially inner dropping nozzle 52a-in is used to drop the varnish toward the radially inner side of the coil end portion 14a. The second radially outer dropping nozzle 52b-out is used to drop the varnish toward the radially outer side of the coil end portion 14b. The second radially inner dropping nozzle 52b-in is used to drop the varnish toward the radially inner side of the coil end portion 14b.

Each dropping nozzle 52 of the varnish dropping device 50 and the stator 12 supported by the radially outer grasping ring 30 are relatively movable such that the dropping nozzles 52 are disposed at one of a dropping position in the vicinity of the coil end portions 14a and 14b of the stator 12 and a retracted position away from the coil end portions 14a and 14b.

Specifically, the dropping nozzles 52 can be moved by a movement mechanism 54 in the up-down direction and the horizontal direction (specifically, the axial direction of the supported stator 12) with respect to the frame 36. The movement mechanism 54 controls movement of the dropping nozzles 52 in accordance with an electrical instruction from the controller. The movement mechanism 54 can move the dropping nozzles 52 with respect to the frame 36 in the up-down direction and the horizontal direction to advance and retract the dropping nozzles 52 between the dropping position, at which the dropping nozzles 52 should be positioned when the varnish is dropped, and the retracted position, at which the dropping nozzles 52 should be positioned when the varnish is not dropped.

When the first and second radially outer dropping nozzles 52a-out and 52b-out are at the dropping position, the distal ends of the nozzles are located in a region above the upper annular portions of the coil end portions 14a and 14b on the radially outer side of the coil end portions 14a and 14b of the stator 12 supported by the radially outer grasping ring 30 so that the varnish dropped by the gravitational force is dropped onto the radially outer side of the coil end portions 14a and 14b.

When the first and second radially inner dropping nozzles 52a-in and 52b-in are at the dropping position, meanwhile, the distal ends of the nozzles are located in a region above the lower annular portions of the coil end portions 14a and 14b on the radially inner side (axial center side) of the coil end portions 14a and 14b of the stator 12 supported by the radially outer grasping ring 30 so that the varnish dropped by the gravitational force is dropped toward the radially inner side of the coil end portions 14a and 14b.

When the dropping nozzles 52 are at the retracted position, further, the distal ends of the nozzles are located in a region above the coil end portions 14a and 14b of the stator 12 supported by the radially outer grasping ring 30 and offset in the horizontal direction (specifically, toward the outer side in the axial direction) from the position of the coil end portions 14a and 14b.

The first radially outer dropping nozzle 52a-out and the first radially inner dropping nozzle 52a-in used to drop the varnish onto the same coil end portion 14a may be moved in synchronization with each other by the integrated movement mechanism 54.

In this case, for example, when moving the first radially outer dropping nozzle 52a-out and the first radially inner dropping nozzle 52a-in from the retracted position to the dropping position, the movement mechanism 54 first descends the dropping nozzles 52a-out and 52a-in from the retracted position, and thereafter moves the dropping nozzles 52a-out and 52a-in in the horizontal direction (rightward in FIG. 1B). When such movement is made, both the first radially outer dropping nozzle 52a-out and the first radially inner dropping nozzle 52a-in reach the dropping position. When moving the dropping nozzles 52a-out and 52a-in from the dropping position to the retracted position, meanwhile, the movement mechanism 54 first moves the dropping nozzles 52a-out and 52a-in in the horizontal direction (leftward in FIG. 1B) from the dropping position, and thereafter ascends the dropping nozzles 52a-out and 52a-in, in the order opposite to the movement to the dropping position described above. When such movement is made, both the first radially outer dropping nozzle 52a-out and the first radially inner dropping nozzle 52a-in reach the retracted position.

Similarly, the second radially outer dropping nozzle 52b-out and the second radially inner dropping nozzle 52b-in used to drop the varnish onto the same coil end portion 14b may be moved in synchronization with each other by the integrated movement mechanism 54.

In this case, for example, when moving the second radially outer dropping nozzle 52b-out and the second radially inner dropping nozzle 52b-in from the retracted position to the dropping position, the movement mechanism 54 first descends the dropping nozzles 52b-out and 52b-in from the retracted position, and thereafter moves the dropping nozzles 52b-out and 52b-in in the horizontal direction (leftward in FIG. 1B). When such movement is made, both the second radially outer dropping nozzle 52b-out and the second radially inner dropping nozzle 52b-in reach the dropping position. When moving the dropping nozzles 52b-out and 52b-in from the dropping position to the retracted position, meanwhile, the movement mechanism 54 first moves the dropping nozzles 52b-out and 52b-in in the horizontal direction (rightward in FIG. 1B) from the dropping position, and thereafter ascends the dropping nozzles 52b-out and 52b-in, in the order opposite to the movement to the dropping position described above. When such movement is made, both the second radially outer dropping nozzle 52b-out and the second radially inner dropping nozzle 52b-in reach the retracted position.

The varnish impregnation apparatus 10 also includes two types of heating devices 60 and 62 that heat the stator 12. The heating device 60 is a device that heats the stator 12 from the radially inner side of the stator 12. Meanwhile, the heating device 62 is a device that heats the stator 12 from the radially outer side and/or the axially outer side of the stator 12. Hereinafter, the heating device 60 will be referred to as a "first heating device 60", and the heating device 62 will be referred to as a "second heating device 62".

The first heating device 60 includes an induction coil 64 that extends spirally. The induction coil 64 is disposed in the cavity portion 20 of the stator core 16 when heating the stator 12. The outside diameter of the induction coil 64 is smaller than the diameter of the cavity portion 20. The induction coil 64 is electrically connected to the controller. A current that flows through the induction coil 64 is varied in accordance with an instruction from the controller when the induction coil 64 is inserted into the cavity portion 20, which generates an eddy current in the stator 12 through electromagnetic induction to heat the stator 12 through induction heating (IH).

The first heating device 60 and the stator 12 supported by the radially outer grasping ring 30 are relatively movable such that the first heating device 60 is disposed in one of a space inside the cavity portion 20 of the stator core 16 of the stator 12 and a space outside the cavity portion 20. Specifically, the first heating device 60 can be moved by a movement mechanism 66 in the horizontal direction (specifically, the axial direction of the supported stator 12) with respect to the frame 36.

The movement mechanism 66 controls movement of the first heating device 60 in accordance with an electrical instruction from the controller. The movement mechanism 66 can move the first heating device 60 in the horizontal direction with respect to the frame 36 to advance and retract the induction coil 64 between a predetermined position (induction heating position) inside the cavity portion 20 of the supported stator 12 and a predetermined position (retracted position) outside the cavity portion 20. The induction coil 64 can heat the stator 12 through induction heating when positioned inside the cavity portion 20 of the supported stator 12. On the other hand, the induction coil 64 cannot heat the stator 12 through induction heating when positioned outside the cavity portion 20 of the supported stator 12.

The second heating device 62 includes hot-air nozzles 70 that communicate with a hot-air generator (not illustrated). The hot-air nozzles 70 are provided in correspondence with the coil end portions 14*a* and 14*b* at both ends, in the axial direction, of the stator 12. Specifically, the second heating device 62 includes, as the hot-air nozzles 70, hot-air nozzles 70*a* corresponding to the coil end portion 14*a* and hot-air nozzles 70*b* corresponding to the coil end portion 14*b*. The hot-air nozzles 70*a* are used to blow hot air toward the periphery (outer surface) of the coil end portion 14*a*. Meanwhile, the hot-air nozzles 70*b* are used to blow hot air toward the periphery (outer surface) of the coil end portion 14*b*. The second heating device 62 heats the stator 12 using hot air by feeding hot air generated in the hot air generator from the distal ends of the hot-air nozzles 70 toward the coil end portions 14*a* and 14*b* in accordance with an instruction from the controller.

The hot-air nozzles 70 are disposed in the vicinity of the coil end portions 14*a* and 14*b* when heating the stator 12. Specifically, the hot-air nozzles 70 are disposed such that the distal ends of the hot-air nozzles 70 are positioned on the radially outer side and axially outer side of a corner portion between the radially outer end and the axially outer end of the coil end portions 14*a* and 14*b*. When heating the stator 12, the distal ends of the hot-air nozzles 70 are directed toward the corner portion between the radially outer end and the axially outer end of the coil end portions 14*a* and 14*b*. A plurality of (e.g. eight) hot-air nozzles 70*a* are provided at equal intervals around the coil end portion 14*a*. Meanwhile, a plurality of (e.g. eight) hot-air nozzles 70*b* are provided at equal intervals around the coil end portion 14*b*.

A cover 72*a* in a cylindrical shape is attached to the outer peripheral side of the hot-air nozzles 70*a*. The cover 72*a* is formed to surround all the hot-air nozzles 70*a* from the outer peripheral side. Specifically, all the hot-air nozzles 70*a* are configured to penetrate an end surface, in the axial direction, of the cover 72*a* in the axial direction and such that the distal ends of the hot-air nozzles 70*a* are directed toward the corner portion of the coil end portion 14*a* on the inner side of a side surface of the cover 72*a*. The cover 72*a* is disposed so as to cover the coil end portion 14*a* from the outer peripheral side when heating the stator 12, and has a function of making it difficult for the hot air from the hot-air nozzles 70*a* to escape to the outside to facilitate heating of the stator 12 (in particular, the coil end portion 14*a*).

Similarly, a cover 72*b* in a cylindrical shape is attached to the outer peripheral side of the hot-air nozzles 70*b*. The cover 72*b* is formed to surround all the hot-air nozzles 70*b* from the outer peripheral side. Specifically, all the hot-air nozzles 70*b* are configured to penetrate an end surface, in the axial direction, of the cover 72*b* in the axial direction and to be directed toward the corner portion of the coil end portion 14*b* on the inner side of a side surface of the cover 72*b*. The cover 72*b* is disposed so as to cover the coil end portion 14*b* from the outer peripheral side when heating the stator 12, and has a function of making it difficult for the hot air from the hot-air nozzles 70*b* to escape to the outside to facilitate heating of the stator 12 (in particular, the coil end portion 14*b*).

The hot-air nozzles 70*a* of the second heating device 62 and the stator 12 supported by the radially outer grasping ring 30 are relatively movable such that the hot-air nozzles 70*a* are disposed at one of a position in the vicinity of the coil end portion 14*a* of the stator core 16 of the stator 12 and a position away from the coil end portion 14*a*. Specifically, the hot-air nozzles 70*a* of the second heating device 62 are supported so as to be turnable and movable with respect to the frame 36 via a link portion 74. The hot-air nozzles 70*a* are attached to one end of the link portion 74. The other end of the link portion 74 is supported on the frame 36 for fixation. The hot-air nozzles 70*a* and the link portion 74 can be turned about a support point C and moved in the horizontal direction (specifically, the axial direction of the supported stator 12) with respect to the frame 36 by a movement mechanism 76. The axial direction of the support point C is the same as the axial direction of the stator 12 supported by the radially outer grasping ring 30. The movement mechanism 76 controls movement of the hot-air nozzles 70*a* of the second heating device 62 in accordance with an electrical instruction from the controller.

The movement mechanism 76 can turn the link portion 74 and move the link portion 74 in the horizontal direction with respect to the frame 36 to advance and retract the hot-air nozzles 70*a* between a hot air heating position, at which the hot-air nozzles 70*a* should be positioned when hot air is blown toward the outer surface of the coil end portion 14*a*, and a retracted position (the region indicated by the broken line in FIG. 1A), at which the hot-air nozzles 70*a* should be positioned when hot air is not blown. At the hot air heating position, the distal ends of all the hot-air nozzles 70*a* are positioned on the radially outer side and axially outer side of a corner portion between the radially outer end and the axially outer end of the coil end portion 14*a*. Meanwhile, the retracted position is offset on the radially outer side and the axially outer side with respect to the hot air heating position described above, for example.

When moving the hot-air nozzles 70*a* from the retracted position to the hot air heating position, for example, the movement mechanism 76 first turns the link portion 74 in a predetermined direction (the clockwise direction in FIG. 1A) about the support point C from the retracted position, and thereafter moves the link portion 74 in the horizontal direction (rightward in FIG. 1B). When such turn and movement is made, the hot-air nozzles 70*a* reach the hot air heating position. When moving the hot-air nozzles 70*a* from the hot air heating position to the retracted position, meanwhile, the movement mechanism 76 first moves the link portion 74 in the horizontal direction (leftward in FIG. 1B) from the hot air heating position, and thereafter turns the link portion 74 in a predetermined direction (the counterclockwise direction in FIG. 1A) about the support point C, in the order opposite to the turn and movement to the hot air heating position described above.

The hot-air nozzles 70*b* of the second heating device 62 are integrally attached to the first heating device 60 described above. The hot-air nozzles 70*b* can be moved by the movement mechanism 66 described above in the horizontal direction (specifically, the axial direction of the supported stator 12) with respect to the frame 36 together with the first heating device 60. The movement mechanism 66 controls movement of the hot-air nozzles 70b of the second heating device 62 at the same time as controlling movement of the first heating device 60 in accordance with an electrical instruction from the controller.

The movement mechanism 66 can move the hot-air nozzles 70b of the second heating device 62 in the horizontal direction with respect to the frame 36 to advance and retract the hot-air nozzles 70b between a hot air heating position, at which the hot-air nozzles 70b should be positioned when hot air is blown toward the outer surface of the coil end portion 14b, and a retracted position, at which the hot-air nozzles 70b should be positioned when hot air is not blown. At the hot air heating position, the distal ends of all the hot-air nozzles 70b are positioned on the radially outer side and axially outer side of a corner portion between the radially outer end and the axially outer end of the coil end portion 14b. Meanwhile, the retracted position is offset on the radially outer side and the axially outer side with respect to the hot air heating position described above, for example.

When the hot-air nozzles 70 are positioned at the retracted position, hot air is not blown toward the coil end portions 14a and 14b, and thus the stator 12 is not heated. When the hot-air nozzles 70 are positioned at the hot air heating position, on the other hand, hot air from the hot-air nozzles 70 is blown toward the outer surface of the coil end portions 14a and 14b, and thus the stator 12 is heated.

The radially outer grasping ring 30, the varnish dropping device 50, the first and second heating devices 60 and 62, and the frame 36 of the varnish impregnation apparatus 10 are installed inside a single box body.

Figure 4A:
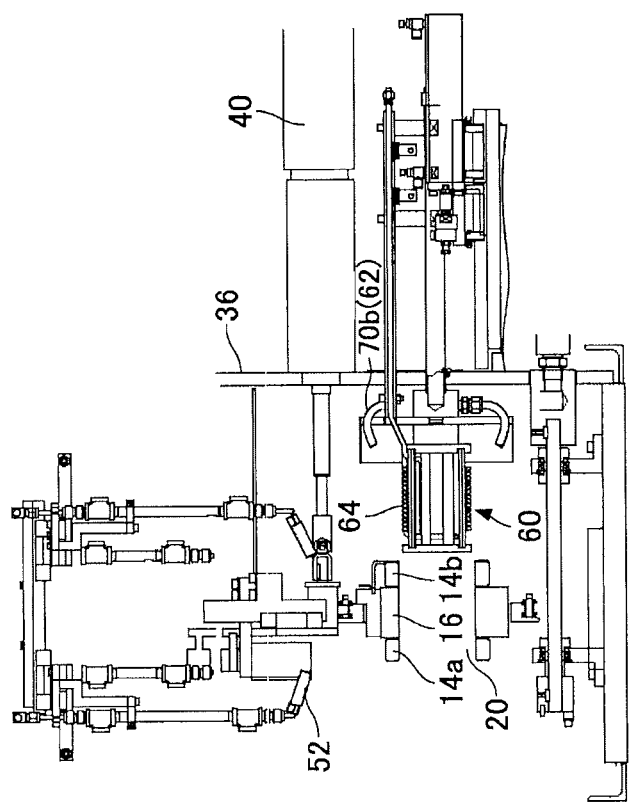
FIG. 4 illustrates operation of the varnish impregnation apparatus according to the embodiment at the time of attaching the stator.
Figure 4B:
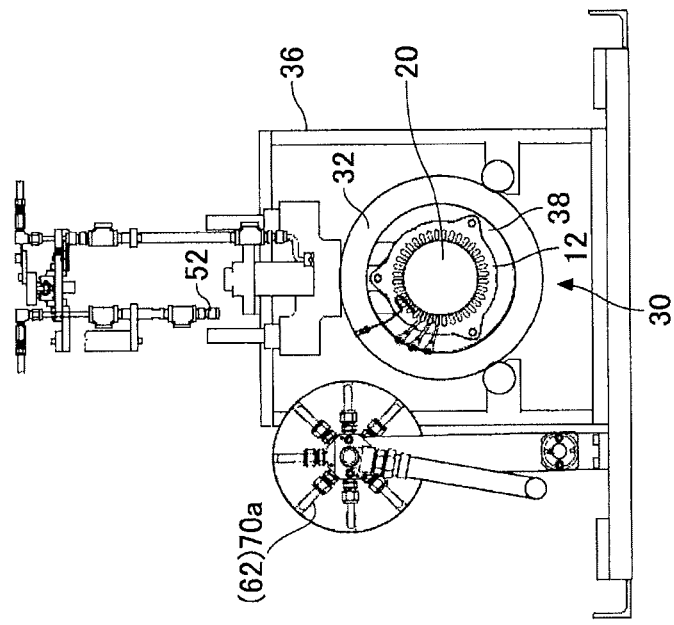
Figure 7A:
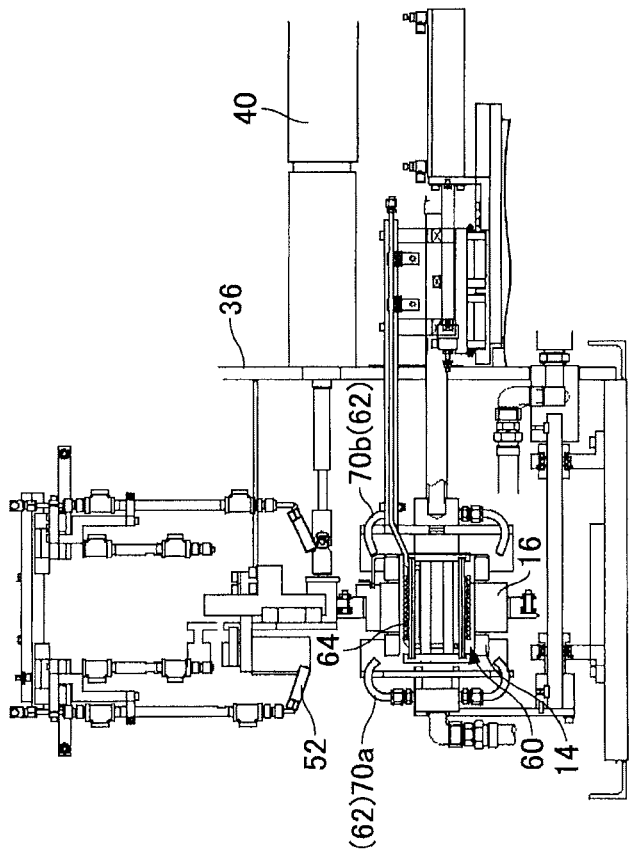
FIG. 7 illustrates operation of the varnish impregnation apparatus according to the embodiment at the time of heating the varnish dropped onto the coil end portions to cure the varnish.
Figure 7B:
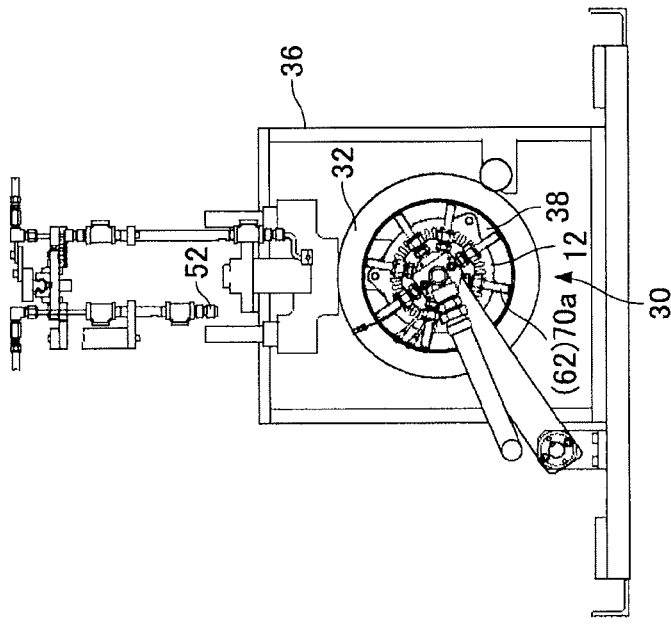

Next, a method in which the varnish impregnation apparatus 10 according to the embodiment impregnates the stator coil 14 with the varnish will be described with reference to FIGS. 4 to 7. FIG. 4 illustrates operation of the varnish impregnation apparatus 10 according to the embodiment at the time of attaching the stator 12. FIG. 5 illustrates operation of the varnish impregnation apparatus 10 according to the embodiment at the time of preliminary heating the supported stator 12. FIG. 6 illustrates operation of the varnish impregnation apparatus 10 according to the embodiment at the time of dropping the varnish onto the coil end portions 14a and 14b of the supported stator 12. FIG. 7 illustrates operation of the varnish impregnation apparatus 10 according to the embodiment at the time of heating the varnish dropped onto the coil end portions 14a and 14b to cure the varnish. FIGS. 4A, 5A, 6A, and 7A are each a front view. FIGS. 4B, 5B, 6B, and 7B are each a side view (for some components, a sectional view).

In the embodiment, in order to impregnate the stator coil 14 of the stator 12 with the varnish, the varnish impregnation apparatus 10 performs (1) a stator attachment step in which the stator 12 is supported on the radially outer side by the radially outer grasping ring 30, (2) a preliminary heating step in which the supported stator 12 is preliminarily heated, (3) a varnish dropping step in which the varnish is dropped onto the coil end portions 14a and 14b of the preliminarily heated stator 12, and (4) a heating and curing step in which the varnish dropped onto the coil end portions 14a and 14b is heated and cured, the steps being performed in this order.

In the varnish impregnation apparatus 10, in the stator attachment step, first, as illustrated in FIG. 4, the dropping nozzles 52 of the varnish dropping device 50 are positioned at the retracted position by the movement mechanism 54, the first heating device 60 and the hot-air nozzles 70b of the second heating device 62 are positioned at the retracted position by the movement mechanism 66, and the hot-air nozzles 70a of the second heating device 62 are positioned at the retracted position by the movement mechanism 76. Then, with the turning portion 34b-1 of the chuck portion 34b of the radially outer grasping ring 30 turned to the unclamping position, the stator 12 as a workpiece is set to the radially outer grasping ring 30 from the axially outer side (the left side in FIG. 4B) such that the fixation lug portion 24 of the stator core 16 is clamped by the pair of projecting portions 34a in the circumferential direction, and thereafter the turning portion 34b-1 is turned to the clamping position.

When such a state is established, the stator 12 housed in the cavity portion 38 of the ring portion 32 of the radially outer grasping ring 30 is grasped on the radially outer side of the stator 12 by the radially outer grasping ring 30 to be supported with the fixation lug portion 24 of the stator core 16 clamped by the pair of the projecting portions 34a in the circumferential direction and with the outer peripheral surface of the stator core 16 contacting the distal end of the turning portion 34b-1 to be supported.

When the stator 12 is supported on the radially outer side by the radially outer grasping ring 30 in the stator attachment step, the controller for the varnish impregnation apparatus 10 next performs the preliminary heating step. In the preliminary heating step, first, as illustrated in FIG. 5, with the dropping nozzles 52 of the varnish dropping device 50 kept positioned at the retracted position, the first heating device 60 and the hot-air nozzles 70b of the second heating device 62 are moved to the induction heating position or the hot air heating position by the movement mechanism 66, the hot-air nozzles 70a of the second heating device 62 are moved to the hot air heating position by the movement mechanism 76, and the rotary motor 40 is rotated.

When such position movement is made, the induction coil 64 of the first heating device 60 is inserted into the cavity portion 20 of the stator 12 supported by the radially outer grasping ring 30, and the hot-air nozzles 70 of the second heating device 62 are disposed, on the outer peripheral side of the coil end portions 14a and 14b of the stator 12 (specifically, on the radially outer side and the axially outer side with respect to the corner portion between the radially outer end and the axially outer end of the coil end portions 14a and 14b), with the distal ends of the hot-air nozzles 70 of the second heating device 62 directed toward the corner portion of the coil end portions 14a and 14b. When the rotary motor 40 is rotated, meanwhile, the radially outer grasping ring 30 supporting the stator 12 is rotated with respect to the frame 36 while being supported by the rotary support member 42, and thus the stator 12 is also rotated with respect to the frame 36.

Then, in the preliminary heating step, next, a current is supplied to the induction coil 64 of the first heating device 60, and the hot air generator of the second heating device 62 is actuated. When such a state is established, the stator 12 supported by the radially outer grasping ring 30 is heated by the induction coil 64 through induction heating, and the stator 12 (mainly the coil end portions 14a and 14b) is heated using hot air, with hot air from the hot-air nozzles 70 directly blown to the outer surface (specifically, the corner portion) of the coil end portions 14a and 14b or with the temperature of the spaces in the covers 72a and 72b raised by the hot air from the hot-air nozzles 70.

When the stator 12 is preliminarily heated in this way, the viscosity of the varnish that adheres to the stator coil 14 can be reduced in the case where the varnish is thereafter dropped onto the stator coil 14 of the stator 12, as a result of which infiltration of the varnish into the stator coil 14 can be promoted.

When the stator 12 is preliminarily heated in the preliminary heating step, the controller of the varnish impregnation apparatus 10 next performs the varnish dropping step. In the varnish dropping step, first, as illustrated in FIG. 6, the first heating device 60 and the hot-air nozzles 70*b* of the second heating device 62 are moved to the retracted position by the movement mechanism 66, the hot-air nozzles 70*a* of the second heating device 62 are moved to the retracted position by the movement mechanism 76, and thereafter the dropping nozzles 52 of the varnish dropping device 50 are moved to the dropping position by the movement mechanism 54.

When such position movement is made, the induction coil 64 of the first heating device 60 is retracted from the inside to the outside of the cavity portion 20 of the stator 12 supported by the radially outer grasping ring 30, the hot-air nozzles 70 of the second heating device 62 are retracted from the vicinity of the coil end portions 14*a* and 14*b* of the stator 12, and the dropping nozzles 52 are disposed at the dropping position above the coil end portions 14*a* and 14*b*.

Then, in the varnish dropping step, the pump or the like is next actuated to supply the varnish in the tank toward the dropping nozzles 52. When such a state is established, the varnish is dropped from the dropping nozzles 52 toward the coil end portions 14*a* and 14*b* of the stator 12 supported by the radially outer grasping ring 30. In this event, the stator 12 is rotated with respect to the frame 36 along with rotation of the radially outer grasping ring 30, and thus the varnish is dropped equally over the entire circumference of the coil end portions 14*a* and 14*b*. In this event, in addition, the stator 12 has been preliminarily heated in the preliminary heating step, which facilitates infiltration of the varnish dropped onto the coil end portions 14*a* and 14*b* into the stator coil 14.

The rotational direction of the stator 12 during dropping of the varnish may be changed in accordance with the model of the stator 12, or the stator 12 may be swung by repeatedly rotating the stator 12 forward and in reverse. In this case, various stators 12 can be supported in terms of the type of winding such as distributed winding and concentrated winding and the type of coil wire such as a thin round wire and a flat rectangular wire.

When the varnish is dropped onto the coil end portions 14*a* and 14*b* of the stator coil 14 in the varnish dropping step, the controller for the varnish impregnation apparatus 10 next performs the heating and curing step. In the heating and curing step, first, as illustrated in FIG. 7, the dropping nozzles 52 of the varnish dropping device 50 are moved to the retracted position by the movement mechanism 54, the first heating device 60 and the hot-air nozzles 70*b* of the second heating device 62 are thereafter moved to the induction heating position or the hot air heating position by the movement mechanism 66, and the hot-air nozzles 70*a* of the second heating device 62 are moved to the hot air heating position by the movement mechanism 76.

When such position movement is made, the dropping nozzles 52 are retracted from the dropping position above the coil end portions 14*a* and 14*b*, the induction coil 64 of the first heating device 60 is inserted into the cavity portion 20 of the stator 12 supported by the radially outer grasping ring 30, and the hot-air nozzles 70 of the second heating device 62 are disposed, on the outer peripheral side of the coil end portions 14*a* and 14*b* of the stator 12 (specifically, on the radially outer side and the axially outer side with respect to the corner portion between the radially outer end and the axially outer end of the coil end portions 14*a* and 14*b*), with the distal ends of the hot-air nozzles 70 of the second heating device 62 directed toward the corner portion of the coil end portions 14*a* and 14*b*.

Then, in the heating and curing step, next, a current is supplied to the induction coil 64 of the first heating device 60, and the hot air generator of the second heating device 62 is actuated. When such a state is established, the stator 12 supported by the radially outer grasping ring 30 is heated by the induction coil 64 through induction heating, and the stator 12 (mainly the coil end portions 14*a* and 14*b*) is heated using hot air, with hot air from the hot-air nozzles 70 directly blown to the outer surface (specifically, the corner portion) of the coil end portions 14*a* and 14*b* or with the temperature of the spaces in the covers 72*a* and 72*b* raised by the hot air from the hot-air nozzles 70. When the stator 12 is heated in this way, the varnish dropped onto the coil end portions 14*a* and 14*b* is heated to be cured.

When the varnish dropped onto the coil end portions 14*a* and 14*b* of the stator 12 is heated to be cured in the heating and curing step, next, in the controller for the varnish impregnation apparatus 10, the first heating device 60 and the hot-air nozzles 70*b* of the second heating device 62 are moved to the retracted position by the movement mechanism 66, and the hot-air nozzles 70*a* of the second heating device 62 are moved to the retracted position by the movement mechanism 76. When such position movement is made, the induction coil 64 of the first heating device 60 and the hot-air nozzles 70 of the second heating device 62 are retracted to the retracted position with the dropping nozzles 52 of the varnish dropping device 50 kept positioned at the retracted position.

Then, from such a situation, the turning portion 34*b*-1 of the chuck portion 34*b* of the radially outer grasping ring 30 is turned to the unclamping position. When such a state is established, the contact between the distal end of the turning portion 34*b*-1 and the outer peripheral surface of the stator core 16 of the stator 12 housed in the cavity portion 38 of the ring portion 32 of the radially outer grasping ring 30 is released, and thus the support of the stator 12 on the radially outer side is released. In this case, the stator 12 impregnated with the varnish can be taken out from the inside of the cavity portion 38 of the ring portion 32 of the radially outer grasping ring 30. The stator 12 is preferably taken out at a timing after the stator 12 is cooled.

Thus, in the varnish impregnation apparatus 10 according to the embodiment, the stator 12 can be supported by the radially outer grasping ring 30, whose ring portion 32 is supported so as to be rotatable with respect to the frame 36 fixed to the ground surface, on the radially outer side of the stator 12 while rotating the stator 12, the supported stator 12 can be preliminarily heated before the varnish is dropped, thereafter the varnish can be dropped onto the coil end portions 14*a* and 14*b* of the preliminarily heated stator 12, and then the varnish dropped onto the coil end portions 14*a* and 14*b* can be heated to be cured.

That is, a sequence of steps, namely the preliminary heating step, the varnish dropping step, and the heating and curing step, required to impregnate the stator coil 14 with the varnish can be performed with the stator 12 supported at the same position by the radially outer grasping ring 30 while rotating the stator 12. In this respect, according to the embodiment, all the steps for impregnating the stator coil 14 with the varnish can be performed at the same location. Thus, it is not necessary to provide a conveyance mechanism that connects between the steps, which contributes to the simplification, space-saving, and cost reduction of the equipment.

In the varnish impregnation apparatus 10 according to the embodiment, the stator 12 in which the cavity portion 20 is formed at the axial center is not supported on the cavity portion 20 side (radially inner side) but grasped on the radially outer side by the radially outer grasping ring 30, and supported between both end surfaces, in the axial direction, of the stator core 16. In such a structure, it is not necessary to dispose a support member or a support in the cavity portion 20 on the radially inner side of the stator 12 in order to support the stator 12.

Therefore, in the varnish impregnation apparatus 10, the induction coil 64 of the first heating device 60 can be inserted into the cavity portion 20 on the radially inner side of the stator 12 to be disposed when heating the stator 12, which enables the stator 12 to be heated from the radially inner side of the stator 12. Thus, the stator 12 can be heated efficiently and effectively.

In the varnish impregnation apparatus 10, the second heating device 62 can be disposed on the radially outer side of the coil end portions 14a and 14b of the stator 12 when heating the stator 12, and thus the stator 12 can be heated from the radially outer side. Thus, the stator 12 can be heated from both the radially inner side and the radially outer side of the stator 12, and thus the entire stator 12 can be heated efficiently and effectively.

Therefore, according to the embodiment, the heating time for preliminarily heating the stator 12 and the heating time for heating the varnish to cure the varnish can be shortened, which improves the productivity in manufacturing the stator 12.

In the varnish impregnation apparatus 10, the induction coil 64 of the first heating device 60, which is inserted into the cavity portion 20 on the radially inner side of the stator 12 to be disposed when heating the stator 12, can be caused to approach the inner radial surface of the stator core 16 as much as possible. Therefore, according to the embodiment, the stator 12 can be heated through induction heating efficiently and effectively compared to a configuration in which the stator 12 is heated through induction heating using an induction coil from the radially outer side of the stator 12 on which the fixation lug portions 24 which project toward the radially outer side are provided on the outer peripheral surface of the yoke 18, which makes it possible to shorten the heating time or to reduce energy for heating the stator 12 to a desired temperature.

In the varnish impregnation apparatus 10, the stator coil 14 is impregnated with the varnish using the varnish dropping device 50 with the stator 12 grasped on the radially outer side of the stator 12 by the radially outer grasping ring 30 to be supported between both end surfaces, in the axial direction, of the stator core 16. In such a structure, during varnish impregnation by the varnish dropping device 50, it is not necessary to insert a support member or a support into the cavity portion 20 on the radially inner side of the stator 12 to be disposed, and it is not necessary to keep a heating device that heats the stator 12 inserted into the cavity portion 20 to be disposed. Therefore, according to the embodiment, the varnish overflowing and dripping from the stator 12 supported by the radially outer grasping ring 30 can be prevented from adhering to the support including the radially outer grasping ring 30, the heating device, or the like.

In the varnish impregnation apparatus 10, the impregnation of the stator core 14 with the varnish performed using the varnish dropping device 50 and the heating and curing of the varnish after the varnish impregnation is performed with the stator 12 rotated with respect to the frame 36. Therefore, according to the embodiment, infiltration of the varnish dropped onto the stator 12 into the stator 12 can be facilitated, which prevents the varnish from overflowing, dripping down, and adhering to the induction coil 64, for example.

In the embodiment described above, the rotary motor 40 corresponds to the "rotary device," the radially outer grasping ring 30 corresponds to the "support," the first heating device 60 corresponds to the "heater," and the second heating device 62 corresponds to the "second heater."

In the embodiment described above, the stator 12 as a workpiece is rotated with respect to the frame 36 in any of the preliminary heating step, the varnish dropping step, and the heating and curing step for the stator 12. However, the present disclosure is not limited thereto, and it is only necessary that the stator 12 should be rotated with respect to the frame 36 at least in the varnish dropping step.

In the embodiment described above, the dropping nozzles 52 of the varnish dropping device 50 are disposed on both the radially inner side and the radially outer side of the coil end portions 14a and 14b of the stator 12 in the varnish dropping step. However, the present disclosure is not limited thereto, and the dropping nozzles 52 may be disposed only above the radially outer side of the coil end portions 14a and 14b, or may be disposed only on the radially inner side of the coil end portions 14a and 14b.

In the embodiment described above, the dropping nozzles 52 of the varnish dropping device 50 can be moved in the up-down direction and the horizontal direction with respect to the frame 36 by the movement mechanism 54. However, the present disclosure is not limited thereto, and the dropping nozzles 52 may be movable only in the up-down direction with respect to the frame 36. In a modification in which the dropping nozzles 52 are disposed only above the radially outer side of the coil end portions 14a and 14b, the dropping nozzles 52 may be movable only in the up-down direction with respect to the frame 36, or may be fixed with respect to the frame 36 so as not to be movable in the up-down direction.

In the embodiment described above, the induction coil 64 of the first heating device 60 and the hot-air nozzles 70b of the second heating device 62 can be moved only in the horizontal direction with respect to the frame 36 by the movement mechanism 66. However, the present disclosure is not limited thereto, and the induction coil 64 and the hot-air nozzles 70b may be movable in both the horizontal direction and the up-down direction with respect to the frame 36.

In the embodiment described above, the hot-air nozzles 70a of the second heating device 62 can be turned and moved in the horizontal direction with respect to the frame 36 by the movement mechanism 76. However, the present disclosure is not limited thereto, and the hot-air nozzles 70a may be only movable in the horizontal direction with respect to the frame 36.

In the embodiment described above, both the induction coil 64 of the first heating device 60 and the hot-air nozzles 70b of the second heating device 62 can be moved with respect to the frame 36 by the common movement mechanism 66. However, the present disclosure is not limited thereto, and the induction coil 64 of the first heating device 60 and the hot-air nozzles 70b of the second heating device 62 may be movable with respect to the frame 36 independently of each other.

Figure 8A:
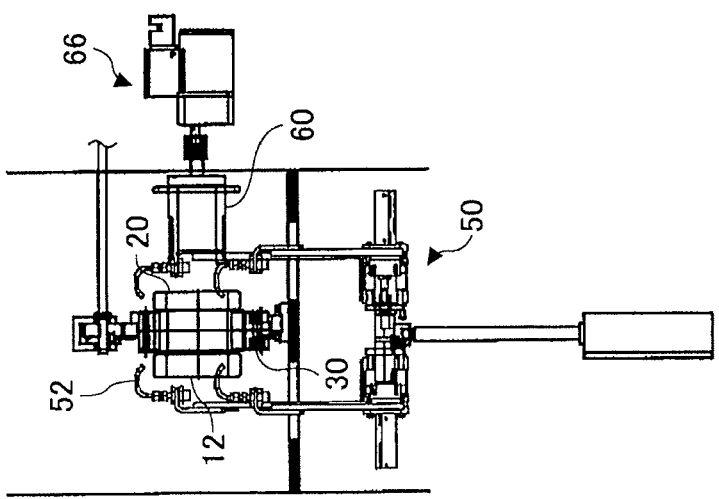
FIG. 8 illustrates operation of a varnish impregnation apparatus according to a modification of the present disclosure.
Figure 8B:
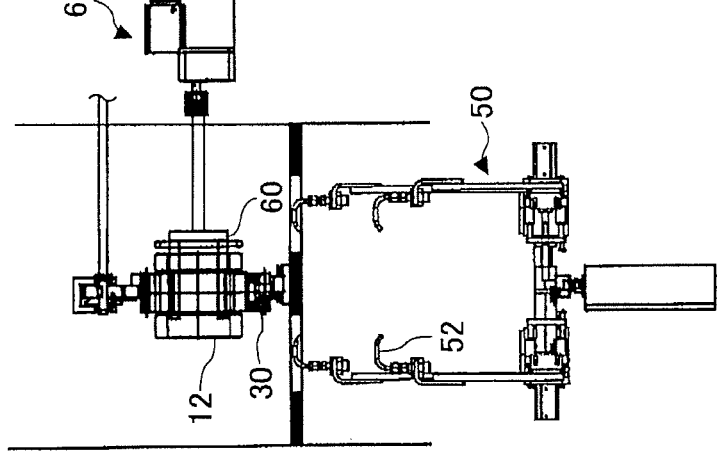
Figure 8C:
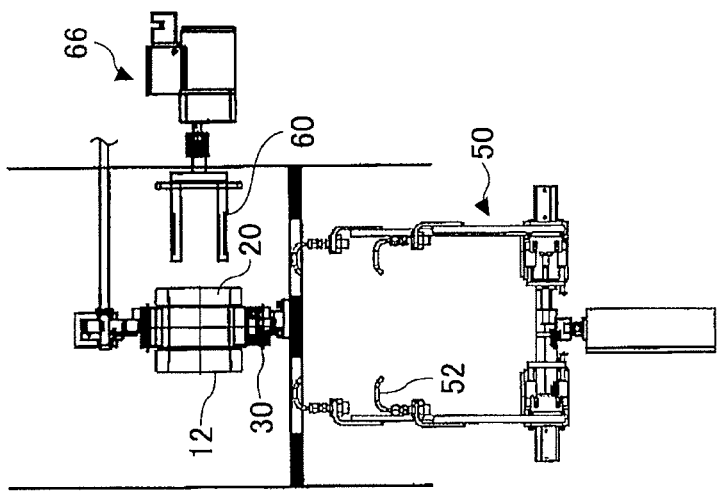

In the embodiment described above, the dropping nozzles 52 of the varnish dropping device 50 are descended from above the stator 12 to be advanced to the dropping position during movement from the retracted position to the dropping position, and ascended from the dropping position during movement from the dropping position to the retracted position, by the movement mechanism 54. However, the present disclosure is not limited thereto. As illustrated in FIG. 8, conversely, the dropping nozzles 52 may be ascended from below the stator 12 to be advanced to the dropping position during movement from the retracted position to the dropping position, and descended from the dropping position during movement from the dropping position to the retracted position.

In the embodiment described above, the first heating device 60 can be advanced and retracted between the induction heating position and the retracted position by the movement mechanism 66, with the radially outer grasping ring 30 kept rotatable with respect to the frame 36 fixed to the ground surface, to make the first heating device 60 and the stator 12 supported by the radially outer grasping ring 30 relatively movable such that the first heating device 60 is disposed at one of a space inside the cavity portion 20 of the stator core 16 and a space outside the cavity portion 20.

However, the present disclosure is not limited thereto, and the structure for relatively moving the first heating device 60 and the stator 12 supported by the radially outer grasping ring 30 may be configured such that the radially outer grasping ring 30 and the stator 12 supported by the radially outer grasping ring 30 are advanced and retracted by a movement mechanism, with the first heating device 60 stationary, between an induction heating position at which the first heating device 60 is disposed in the cavity portion 20 and a retracted position at which the first heating device 60 is not disposed in the cavity portion 20.

For example, as illustrated in FIGS. 9 to 11, the radially outer grasping ring 30 and the stator 12 supported by the radially outer grasping ring 30 may be advanced and retracted by a movement mechanism 100 between the induction heating position, at which the first heating device 60 is disposed in the cavity portion 20, and the retracted position, at which the first heating device 60 is not disposed in the cavity portion 20, with the first heating device 60 stationary. Also in such a modification, the same effect as that of the embodiment described above can be obtained.

Figure 9C:
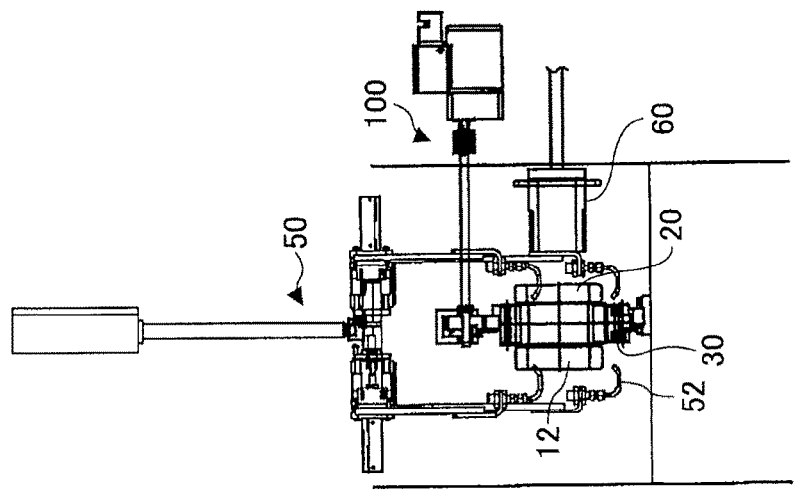
FIG. 9 illustrates operation of a varnish impregnation apparatus according to a modification of the present disclosure.
Figure 9B:
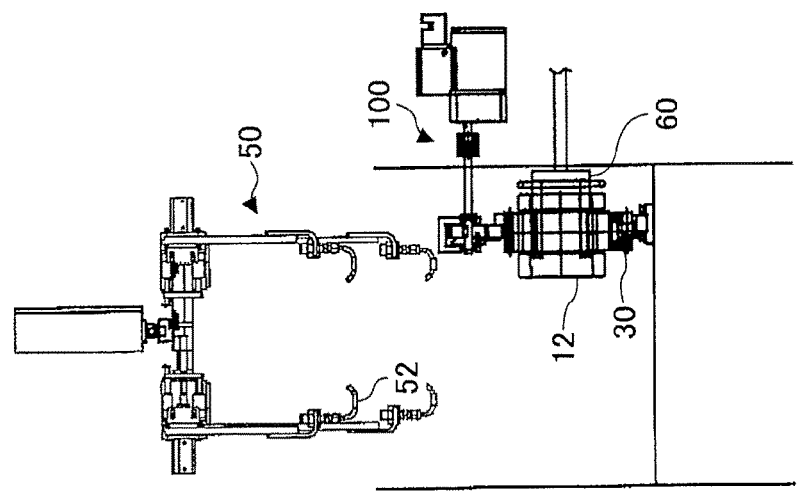
Figure 9A:
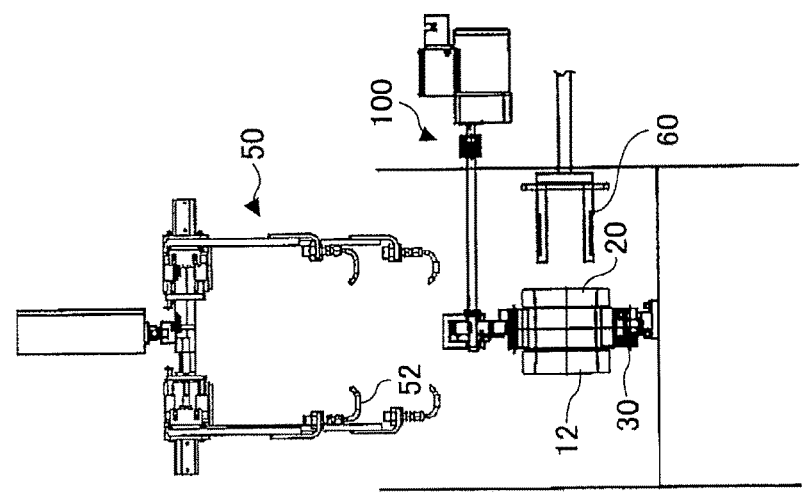

FIGS. 9A, 10A, and 11A illustrate operation of the varnish impregnation apparatus 10 at the time of attaching the stator. FIGS. 9B, 10B, and 11B illustrate operation of the varnish impregnation apparatus 10 at the time of preliminarily heating the stator. FIGS. 9C, 10C, and 11C illustrate operation of the varnish impregnation apparatus 10 at the time of dropping the varnish.

In the modification in which the stator 12 supported by the radially outer grasping ring 30 described above is advanced and retracted between the induction heating position and the retracted position by the movement mechanism 100, as illustrated in FIG. 9, the dropping nozzles 52 of the varnish dropping device 50 may be descended from above the stator 12, with the stator 12 retracted to the retracted position by the movement mechanism 100, to be advanced to the dropping position during movement from the retracted position to the dropping position, and ascended from the dropping position during movement from the dropping position to the retracted position.

In the modification described above, as illustrated in FIG. 10, the dropping nozzles 52 of the varnish dropping device 50 may be descended from above the stator 12, with the stator 12 disposed at the induction heating position by the movement mechanism 100, to be advanced to the dropping position during movement from the retracted position to the dropping position, and ascended from the dropping position during movement from the dropping position to the retracted position.

In the modification described above, as illustrated in FIG. 11, the dropping nozzles 52 of the varnish dropping device 50 may be ascended from below the stator 12, with the stator 12 disposed at the induction heating position by the movement mechanism 100, to be advanced to the dropping position during movement from the retracted position to the dropping position, and descended from the dropping position during movement from the dropping position to the retracted position.

In the embodiment described above, the dropping nozzles 52 of the varnish dropping device 50 are advanced and retracted between the dropping position and the retracted position by the movement mechanism 54, with the radially outer grasping ring 30 kept rotatable with respect to the frame 36 fixed to the ground surface, to make the varnish dropping device 50 and the stator 12 supported by the radially outer grasping ring 30 relatively movable such that the dropping nozzles 52 are disposed at one of the dropping position in the vicinity of the coil end portions 14a and 14b of the stator 12 and the retracted position away from the coil end portions 14a and 14b.

However, the present disclosure is not limited thereto, and the varnish dropping device 50 and the stator 12 supported by the radially outer grasping ring 30 may be made relatively movable such that the stator 12 supported by the radially outer grasping ring 30 is advanced and retracted between the dropping position and the retracted position by a movement mechanism with the varnish dropping device 50 stationary.

In the embodiment described above, further, the present disclosure is applied to a rotary electric machine of an inner rotor type that includes the stator 12 in which the columnar cavity portion 20 is provided at the axial center and which is disposed opposite to a rotor via a predetermined air gap on the radially outer side of the rotor. However, the present disclosure is not limited thereto, and the present disclosure may also be applied to a rotary electric machine of an outer rotor type that includes a stator in which a columnar cavity portion is provided at the axial center and which is disposed opposite to a rotor via a predetermined air gap on the radially inner side of the rotor.

In relation to the embodiment described above, the following configurations are further disclosed.

[1] A varnish impregnation apparatus (10) that impregnates a stator coil (14) mounted to a stator core (16), in which a slot opens toward a radially inner side, with varnish, including: a support (30) that supports a stator (12), in which the stator coil (14) is mounted to the stator core (16), with an axial direction of the stator (12) directed in a horizontal direction while grasping a radially outer side of the stator (12), and that is rotationally driven by a rotary device (40) to rotate the stator (12); a varnish dropping device (50) that drops the varnish toward a coil end portion (14a, 14b) of the stator (12) which is rotated while being supported by the support (30); and a heater (60) disposed in a cavity portion (20) provided at an axial center of the stator core (16) of the stator (12) supported by the support (30) to heat the stator (12) from a radially inner side of the stator (12).

According to the configuration described in [1], the stator (12) is heated by the heater (60) from the radially inner side of the stator (12). Thus, the stator (12) can be heated efficiently and effectively. In addition, the stator (12) is grasped on the radially outer side of the stator (12) by the support (30) to be supported. Thus, adhesion of the varnish to the support (30) for the stator (12) can be prevented.

[2] The varnish impregnation apparatus (10) described in [1], in which the support (30) is disposed between both end surfaces, in the axial direction, on an outer peripheral side of the stator core (16).

[3] The varnish impregnation apparatus (10) described in [1] or [2], in which the heater (60) and the stator (12) supported by the support (30) are relatively movable such that the heater (60) is disposed in one of a space inside the cavity portion (20) and a space outside the cavity portion (20).

According to the configuration described in [3], the heater (60) can be disposed inside the cavity portion (20) of the stator core (16) when the stator (12) is heated by the heater (60), and the heater (60) can be disposed outside the cavity portion (20) of the stator core (16) during varnish impregnation by the varnish dropping device (50). Thus, adhesion of the varnish to the heater (60) after varnish impregnation by the varnish dropping device (50) can be prevented.

[4] The varnish impregnation apparatus (10) described in [3], in which the heater (60) is advanceable and retractable between the space inside the cavity portion (20) and the space outside the cavity portion (20).

[5] The varnish impregnation apparatus (10) described in [3], in which the stator (12) supported by the support (30) is advanceable and retractable between a heating position, at which the heater (60) is disposed in the cavity portion (20), and a retracted position, at which the heater (60) is not disposed in the cavity portion (20).

[6] The varnish impregnation apparatus (10) described in any one of [1] to [5], in which the varnish dropping device (50) and the stator (12) supported by the support (30) are relatively movable such that the varnish dropping device (50) is disposed at one of a dropping position in the vicinity of the coil end portion (14a, 14b) of the stator (12) and a retracted position.

[7] The varnish impregnation apparatus (10) described in [6], in which the varnish dropping device (50) is advanceable and retractable between the dropping position in the vicinity of the coil end portion (14a, 14b) of the stator (12) supported by the support (30) and the retracted position.

[8] The varnish impregnation apparatus (10) described in [7], in which the retracted position of the varnish dropping device (50) is located below the stator (12) supported by the support (30).

[9] The varnish impregnation apparatus (10) described in any one of [1] to [8], in which the support (30) is at the same position when the varnish is dropped by the varnish dropping device (50) and when the stator is heated by the heater (60).

[10] The varnish impregnation apparatus (10) described in any one of [1] to [9], in which the heater (60) includes an induction coil (64) that heats the stator (12) through induction heating.

According to the configuration described in [10], the stator (12) can be heated through induction heating from the radially inner side using the heater (60).

[11] The varnish impregnation apparatus (10) described in any one of [1] to [10], further including a second heater (62) disposed in the vicinity of the coil end portion (14a, 14b) of the stator (12) supported by the support (30) to heat the coil end portion (14a, 14b).

According to the configuration described in [11], the varnish dropped onto the coil end portion (14a, 14b) can be heated to be cured.

[12] The varnish impregnation apparatus (10) described in [11], in which the second heater (62) heats the coil end portion (14a, 14b) by blowing hot air toward an outer surface of the coil end portion (14a, 14b).

[13] The varnish impregnation apparatus (10) described in any one of [1] to [12], in which the support (30) supports the stator (12) by clamping both ends of a fixation lug portion (24) provided on the stator core (16) to project toward a radially outer side.

[14] A varnish impregnation method for impregnating a stator coil (14) mounted to a stator core (16), in which a slot opens toward a radially inner side, with varnish, including: a preliminary heating step of heating a stator (12), in which the stator coil (14) is mounted to the stator core (16) and which is supported with an axial direction of the stator (12) directed in a horizontal direction with a support (30) grasping a radially outer side of the stator (12), from a radially inner side of the stator (12) using a heater (60) disposed in a cavity portion (20) provided at an axial center of the stator core (16); a varnish dropping step of dropping the varnish toward a coil end portion (14a, 14b) of the stator (12) using a varnish dropping device (50), the stator (12) being supported with the axial direction directed in the horizontal direction with the support (30) grasping the radially outer side and being rotated with the support (30) rotationally driven by a rotary device (40) with the heater (60) retracted from the cavity portion (20), the varnish dropping step being performed after the heating in the preliminary heating step; and a heating and curing step of heating the varnish dropped onto the coil end portion (14a, 14b) using the heater (60) to cure the varnish with the stator (12) supported with the axial direction directed in the horizontal direction with the support (30) grasping the radially outer side of the stator (12) and with the heater (60) disposed in the cavity portion (20), the heating and curing step being performed after the varnish dropping in the varnish dropping step.

According to the configuration described in [14], the stator (12) is heated by the heater (60) from the radially inner side of the stator (12) when the stator (12) is preliminarily heated and the varnish is heated to be cured. Thus, the stator (12) can be heated efficiently and effectively. In addition, the stator (12) is grasped on the radially outer side of the stator (12) by the support (30) to be supported. Thus, adhesion of the varnish to the support (30) for the stator (12) can be prevented.

[15] The varnish impregnation method described in [14], in which the support (30) is at the same position when the varnish is dropped by the varnish dropping device (50) and when the stator is heated by the heater (60).

[16] The varnish impregnation method described in [14] or [15], in which: the preliminary heating step includes a step of heating the coil end portion (14a, 14b) using a second heater (62) disposed in the vicinity of the coil end portion (14a, 14b) of the stator (12) supported by the support (30); the varnish dropping step includes dropping the varnish toward the coil end portion (14a, 14b) of the stator (12) supported by the support (30) with the second heater (62) retracted from the vicinity of the coil end portion (14a, 14b); and the heating and curing step includes heating the varnish dropped onto the coil end portion (14a, 14b) to cure the varnish using the heater (60) and the second heater (62) with the heater (60) disposed in the cavity portion (20) and with the second heater (62) disposed in the vicinity of the coil end portion (14a, 14b).

According to the configuration described in [16], the stator (12) can be preliminarily heated and the varnish can be heated to be cured using the second heater (62) together with the heater (60).

[17] The varnish impregnation method described in any one of [14] to [16], in which both the preliminary heating step and the heating and curing step include heating the stator (12) rotated with the support (30) rotationally driven by the rotary device (40).

[18] The varnish impregnation method described in [17], in which the varnish dropping step includes dropping the varnish toward the coil end portion (14a, 14b) with the heater (60) retracted from the cavity portion (20), with the second heater (62) retracted from the vicinity of the coil end portion (14a, 14b), and with the varnish dropping device (50) disposed in the vicinity of the coil end portion (14a, 14b).

[19] The varnish impregnation method described in [18], in which: the preliminary heating step includes heating the stator (12) with the heater (60) disposed in the cavity portion (22), with the second heater (62) disposed in the vicinity of the coil end portion (14a, 14b), and with the varnish dropping device (50) retracted from the vicinity of the coil end portion (14a, 14b); and the heating and curing step includes heating the varnish dropped onto the coil end portion (14a, 14b) to cure the varnish with the heater (60) disposed in the cavity portion (20), with the second heater (62) disposed in the vicinity of the coil end portion (14a, 14b), and with the varnish dropping device (50) retracted from the vicinity of the coil end portion (14a, 14b).

The present international application claims priority to Japanese Patent Application No. 2013-146981 filed Jul. 12, 2013, the entire contents of which are incorporated herein.

The invention claimed is:

1. A varnish impregnation apparatus that impregnates a stator coil mounted to a stator core, in which a slot opens toward a radially inner side, with varnish, comprising:
   a support that supports a stator, in which the stator coil is mounted to the stator core, with an axial direction of the stator directed in a horizontal direction while grasping a radially outer side of the stator, and that is rotationally driven by a rotary device to rotate the stator, wherein the support has a grip that grasps the radially outer side of the stator and is disposed only inside of both end surfaces of the stator core in the axial direction, and on an outer peripheral side of the stator core, and
   a varnish dropping device that drops the varnish toward a coil end portion of the stator which is rotated while being supported by the support; and
   a heater disposed in a cavity portion provided at an axial center of the stator core of the stator supported by the support to heat the stator from a radially inner side of the stator.

2. The varnish impregnation apparatus according to claim 1, wherein
   the heater and the stator supported by the support are relatively movable such that the heater is disposed in one of a space inside the cavity portion and a space outside the cavity portion.

3. The varnish impregnation apparatus according to claim 2, wherein
   the heater is advanceable and retractable between the space inside the cavity portion and the space outside the cavity portion.

4. The varnish impregnation apparatus according to claim 2, wherein
   the stator supported by the support is advanceable and retractable between a heating position, at which the heater is disposed in the cavity portion, and a retracted position, at which the heater is not disposed in the cavity portion.

5. The varnish impregnation apparatus according to claim 1, wherein
   the varnish dropping device and the stator supported by the support are relatively movable such that the varnish dropping device is disposed at one of a dropping position in the vicinity of the coil end portion of the stator and a retracted position.

6. The varnish impregnation apparatus according to claim 5, wherein
   the varnish dropping device is advanceable and retractable between the dropping position in the vicinity of the coil end portion of the stator supported by the support and the retracted position.

7. The varnish impregnation apparatus according to claim 6, wherein
   the retracted position of the varnish dropping device is located below the stator supported by the support.

8. The varnish impregnation apparatus according to claim 1, wherein
   the support is at the same position when the varnish is dropped by the varnish dropping device and when the stator is heated by the heater.

9. The varnish impregnation apparatus according to claim 1, wherein
   the heater includes an induction coil that heats the stator through induction heating.

10. The varnish impregnation apparatus according to claim 1, further comprising:
    a second heater disposed in the vicinity of the coil end portion of the stator supported by the support to heat the coil end portion.

11. The varnish impregnation apparatus according to claim 10, wherein
    the second heater heats the coil end portion by blowing hot air toward an outer surface of the coil end portion.

12. The varnish impregnation apparatus according to claim 1, wherein
    the support supports the stator by clamping both ends of a fixation lug portion provided on the stator core to project toward a radially outer side.

* * * * *